United States Patent
Yamada

(10) Patent No.: US 10,795,619 B2
(45) Date of Patent: Oct. 6, 2020

(54) NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

(71) Applicant: BROTHER KOGYO KABUSHIKI KAISHA, Nagoya-shi, Aichi (JP)

(72) Inventor: Jun Yamada, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/367,822

(22) Filed: Mar. 28, 2019

(65) Prior Publication Data

US 2019/0303059 A1    Oct. 3, 2019

(30) Foreign Application Priority Data

Mar. 30, 2018    (JP) ................................ 2018-066767

(51) Int. Cl.
*G06F 3/12*    (2006.01)

(52) U.S. Cl.
CPC .......... *G06F 3/1208* (2013.01); *G06F 3/1231* (2013.01); *G06F 3/1256* (2013.01); *G06F 3/1261* (2013.01); *G06F 3/1287* (2013.01); *G06F 3/1288* (2013.01)

(58) Field of Classification Search
CPC .............................. G06F 3/1208; G06F 3/1231
See application file for complete search history.

(56) References Cited

U.S. PATENT DOCUMENTS

| 2011/0235085 A1 | 9/2011 | Jazayeri et al. |
| 2011/0299110 A1 | 12/2011 | Jazayeri et al. |
| 2012/0057193 A1 | 3/2012 | Jazayeri et al. |
| 2013/0083353 A1* | 4/2013 | Nishikawa ............ G06F 3/1247 358/1.15 |
| 2014/0313539 A1 | 10/2014 | Kawano |
| 2015/0036182 A1 | 2/2015 | Nakamura |

(Continued)

FOREIGN PATENT DOCUMENTS

| JP | 2013-109616 A | 6/2013 |
| JP | 2013-214228 A | 10/2013 |
| JP | 2014-139823 A | 7/2014 |

*Primary Examiner* — Ibrahim Siddo
(74) *Attorney, Agent, or Firm* — Scully, Scott, Murphy & Presser, PC

(57) ABSTRACT

An information processing device starts a browser, obtains login information, logs in to a cloud server by transmitting the login information to the cloud server, receives a content from the cloud server and displays the content on the browser, receives a print instruction to print the content, and starts a printing application. Then, the information processing device receives an instruction to select a cloud printing or a local printing. When the cloud printing is selected, the cloud printing instruction is transmitted to the cloud server. Then, the cloud server transmits print data to a printer configured to perform the cloud printing. When the local printing is selected, the information processing device downloads the content from the cloud server, generates print data based on the downloaded content, and transmits the generated print data a printer configured to perform the local printing.

10 Claims, 5 Drawing Sheets

(56) References Cited

U.S. PATENT DOCUMENTS

| | | | |
|---|---|---|---|
| 2015/0142894 A1* | 5/2015 | Zmener | H04L 51/32 |
| | | | 709/205 |
| 2017/0068823 A1* | 3/2017 | Stepanov | G06F 21/608 |
| 2017/0280005 A1* | 9/2017 | Matsuda | H04N 1/00973 |

* cited by examiner

NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

CROSS-REFERENCE TO RELATED APPLICATIONS

This application claims priority under 35 U.S.C. § 119 from Japanese Patent Application No. 2018-066767 filed on Mar. 30, 2018. The entire subject matter of the application is incorporated herein by reference.

BACKGROUND

Technical Field

The present disclosures relate to a non-transitory computer-readable recording medium storing computer-executable instructions for information processing device, and method of controlling information processing device, the instructions causing, when executed, a computer to print contents stored in a cloud server.

Related Art

There has been known a so-called cloud printing. When the cloud printing is performed, typically, an information processing device (e.g., a personal computer (PC) or smartphone) is connected to a cloud server on the Internet, and causing a particular printer to print a content stored in the cloud server. Generally, the particular printer is configured to communicate with the cloud server, and receive a print job from the cloud server through the Internet.

SUMMARY

When the cloud printing is to be performed, a printer for the cloud printing must have been registered with the cloud server in advance. Then, the content or data representing the content is transmitted to the registered printer from the cloud server, thereby printing of the content being performed. However, a user is not necessarily be close to the registered printer, and the user may wish to temporarily use another printer for the cloud printing. According to a conventional system for the cloud printing, even a temporarily used printer should be registered to the cloud server in order to enable the temporarily-used printer to print the content. Registration of the printer is a troublesome operation, and the user may feel that usability of such a system is low. Further, the user may wish to use a printer which is not compliant with the cloud printing.

According to aspects of the present disclosures, there is provided a non-transitory computer-readable recording medium for an information processing device having a communication interface and a controller, the information processing device being connected to a cloud server through the communication interface, a particular program being installed in the information processing device, the recording medium storing computer-executable instructions realizing an application program, the application program being added to the particular program by a plugin function implemented in the particular program, and the application program being started by the controller when the particular program receives a print instruction of a content stored in the cloud server. The application program causes, when executed by the controller, the information processing device to perform a selection process of receiving a selection between a cloud printing and a local printing, the cloud printing being a printing process performed by transmitting print data to a cloud printer which is a printer registered with the cloud server, the local printing being a printing process performed by transmitting print data to a local printer which is a printer connected to the information processing device through the communication interface, a downloading process of downloading the content from the cloud server, when the cloud printing is selected in the selection process, a cloud printing instruction outputting process of outputting an instruction to perform the cloud printing to the cloud server, and when the local printing is selected in the selection process, a print data transmitting process of generating print data based on the content downloaded in the downloading process and transmitting the print data as generated to the local printer.

According to aspects of the present disclosures, there is provided a non-transitory computer-readable recording medium for an information processing device having a communication interface and a controller, the information processing device being connected to a cloud server through the communication interface, a particular program being installed in the information processing device, the recording medium storing computer-executable instructions realizing an application program, and the application program being added to the particular program by a plugin function implemented in the particular program, the application program being started by the controller when the particular program receives a print instruction of a content stored in the cloud server. The application program causes, when executed by the controller, the information processing device to perform, a selection process of receiving a selection between a cloud printing and a local printing, the cloud printing being a printing process in which print data is transmitted to a printer from the cloud server not through the information processing device, the local printing being a printing process in which print data is transmitted to a printer from the information processing device, when the cloud printing is selected in the selection process, a cloud printing instruction outputting process of outputting an instruction to perform the cloud printing to the cloud server, and when the local printing is selected in the selection process, a downloading process of downloading the content from the cloud server and a print data transmitting process of generating print data based on the content downloaded in the downloading process and transmitting the print data as generated to the printer configured to perform the local printing.

According to aspects of the present disclosures, there is provided a method for an information processing device configured to print a content stored in a cloud server. The method includes starting a browser, receiving login information to be used to log in to the cloud server, logging in to the cloud server by transmitting the login information to the cloud server, receiving a content from the cloud server and displaying the received content on the browser, receiving a print instruction to print the content displayed on the browser, starting a printing application in which receiving an instruction to perform one of a cloud printing and a local printing, when the received print instruction indicates to perform the cloud printing, transmit cloud printing instruction to a cloud server, the cloud server transmitting print data to a printer configured to perform the cloud printing, and when the received print instruction indicates to perform the local printing, downloading the content from the cloud server, generating print data based on the downloaded content, transmitting generated print data to a printer configured to perform the local printing.

BRIEF DESCRIPTION OF THE
ACCOMPANYING DRAWINGS

DETAILED DESCRIPTION OF THE
EMBODIMENT

Hereinafter, referring to the accompanying drawings, an application program (hereinafter, referred to as an APP) will be described in detail. The APP is used to print a content on the Internet.

Figure 1:
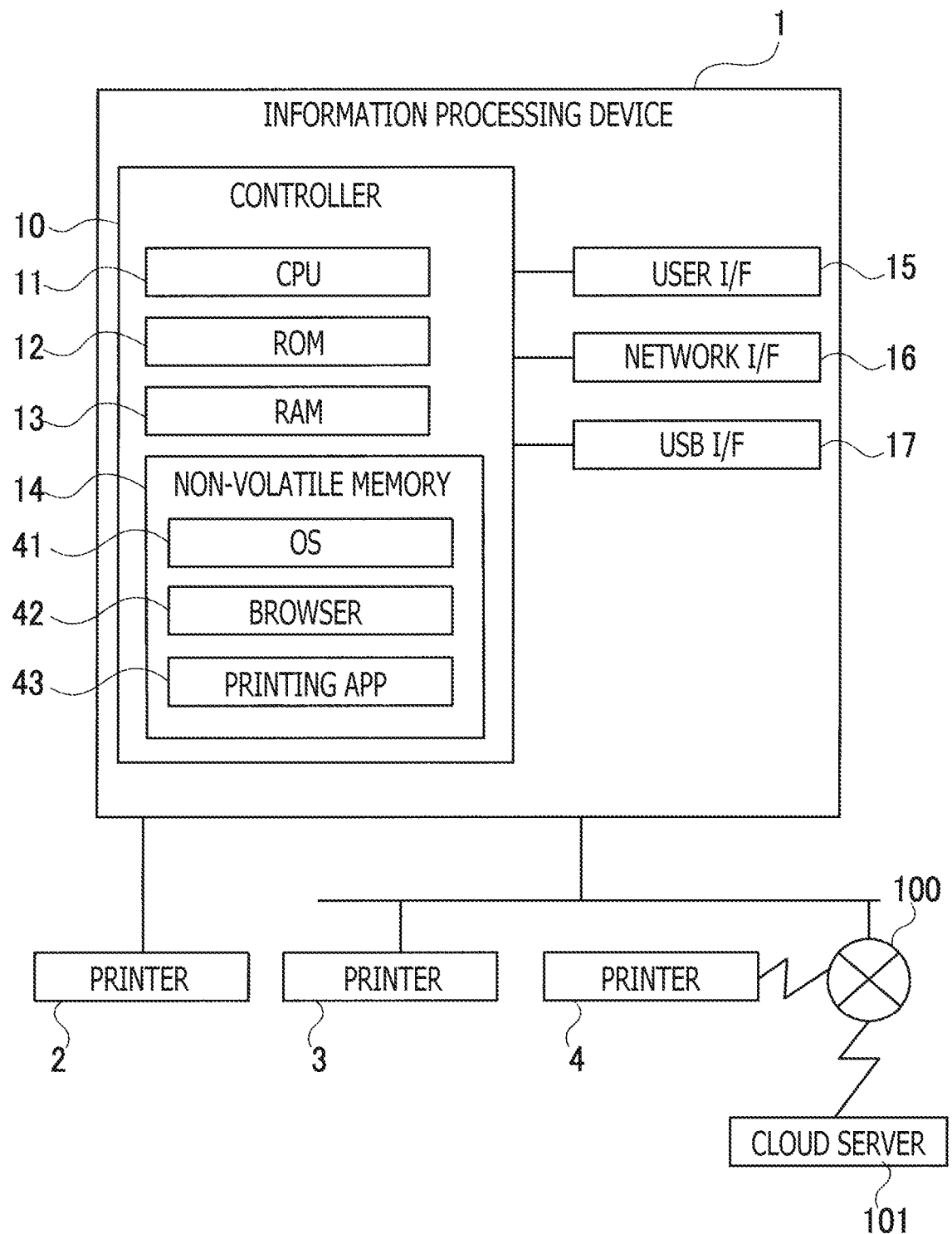
FIG. 1 is a block diagram schematically showing a cloud printing system according to an illustrative embodiment of the present disclosures.

The APP according to the illustrative embodiment is, as shown in FIG. 1, a program which is used when printing is performed, with use of an information processing device 1, by one of a plurality of printers. The information processing device 1 is, for example, a personal computer (PC), a smartphone or a tablet computer, which is configured to generate and edit image data to be printed by any of the printers 2, 3 and 4, and to transmit a print execution instruction to each of the printers 2, 3 and 4.

Each of the printers 2, 3 and 4 each is caused, by the information processing device 1 according to the illustrative embodiment, to perform printing on a printing medium (hereinafter, referred to as an objective medium). Examples of such a printer is a page printer, a copier, an MFP, and a facsimile machine. It is noted that the configurations and the number of information processing device and the printers constituting the printing system need not be limited to those shown in FIG. 1.

The information processing device 1 is configured to connect with a cloud server 101 through, for example, the Internet, as shown in FIG. 1. The cloud server 101 is provided with a storage device and is configured to upload/download various types of contents including a document and an image. It is noted that the cloud server 101 may be constituted by a single device, or configured to operate as a plurality of devices cooperate.

As shown in FIG. 1, the information processing device is provided with a controller 10 which includes a CPU 11, a ROM 12, a RAM 13 and a non-volatile memory 14. Further, the information processing device 1 has a user I/F (interface) 15, a network I/F 16, a USB I/F 17, which are electrically connected to the controller 10. It should be noted that the term "controller" in FIG. 1 is a collective name and may include hardware and software used for controlling the information processing device 1, and the configuration shown in FIG. 1 is only an example of the configuration of the controller 10.

The CPU 11 performs various processes in accordance with programs retrieved from the ROM 12 or the non-volatile memory 14, and/or in accordance with user operations. The ROM 12 stores a startup program to start up the information processing device 1, and other programs. The RAM 13 is used as a work area when various processes are performed, and/or a storage area for temporarily storing data. The non-volatile memory 14 is configured by, for example, an HDD, a flash memory and the like, and is used as an area storing various programs, various pieces of data such as image data and various settings. It is noted that a buffer of the CPU 11, the ROM 12, the RAM 13 and the non-volatile memory 14 are examples of a memory.

The non-volatile memory 14 of the information processing device 1 stores various programs including an operating system (hereinafter, referred to as an OS) 41, a browser 42, a printing APP 43. It is noted that a part of the OS 41 may be stored in the ROM 12.

The browser 42 is a program used to display webpages, and has a plugin function. The browser 42 is an example of a particular program. The plugin function is a function of receiving registration of another program as a plugin APP, and executing the received plugin APP as a kind of subroutine. The browser 42 further has a print instruction function and receives a print instruction through a currently displayed webpage.

The printing APP 43 is implemented to the browser 42 by the plugin function of the browser 42, and is started when the browser receives an instruction to print a content of the cloud server 101. The printing APP 43 performs different processes depending on printing devices designated by the received print instruction. An operation of the printing APP 43 will be described later.

The user I/F 15 includes hardware configured to receive user operations and display information. The hardware included in the user I/F 15 may be a device having both an inputting function and an outputting function (e.g., a touch panel), or a combination of a display, a keyboard and a mouse.

The network I/F 16 includes hardware configured to communicate with an external device through a network such as the Internet. A communication standard for the network I/F 16 may be, for example, an Ethernet®, a Wi-Fi® and the like. The USB I/F 17 includes hardware configured to perform communication based on a USB standard. Modes of communication of the network I/F 16 or the USB I/F 17 may be a wired communication or a wireless communication. The network I/F 16 and the USB I/F 17 are examples of a communication interface.

Next, the printers 2, 3 and 4 will be described. Generally, there are printers which are compliant with the cloud printing, and there are printers which are not compliant with the cloud printing. The cloud printing is a printing method provided by a cloud printing service which makes use of the Internet 100. According to the cloud printing service, a content on the Internet 100 is transmitted, through the Internet 100, to a cloud printer which is registered with the cloud printing service, thereby causing the cloud printer to print the transmitted content. When printing according to the cloud printing is being performed, the printer is only required to be connected to the Internet, and may not necessarily be connected with the information processing device 1.

According to the illustrative embodiment, the printer 2 is not compliant with the cloud printing. In other words, the printer 2 is a local printer to which the information processing device 1 directly transmits a print instruction. The printer 2 is a printer which is not compliant with a data format used in the cloud printing, or a printer which is not connected to the Internet 100. It is noted that the printer 2 may be a printer connected, through the USB OF 17, to the information processing device 1 in one-to-one relationship. Further, the printer 2 may be one which is not provided with a communication interface to be connected with the Internet 100.

The printers 3 and 4 are cloud printers which are compliant with the cloud printing. Both the printers 3 and 4 are compliant with the data format used in the cloud printing. Each of the printers 3 and 4 has a communication interface to connect with the Internet 100, and is connected with the Internet 100. In other words, each of the printers 3 and 4 is configured to be connectable with the cloud server 101 through the Internet 100.

According to the illustrative embodiment, the printer 3 is also connected to the information processing device 1 so to receive print data transmitted from the information processing device 1. It is noted that, according to the illustrative embodiment, it is assumed that the printer 3 is not registered as the cloud printer of the information processing device 1. When registered with the cloud print service, the printer 3 can perform the cloud printing.

The printer 4 is located at a remote place. The printer 4 is not directly connected to the information processing device 1, but has been registered with the cloud printing service as a cloud printer which can be used by the information processing device 1. Thus, the information processing device 1 can designate, through the cloud printing service, the printer 4 as a device to perform printing, and make the printer 4 perform printing.

Next, the printing operation by the printing system according to the illustrative embodiment will be described. The printing operation described below is an operation when a content stored in the cloud server 101 is printed. It is noted that processes and steps of each flowchart represent processes performed by the CPU 11 according to commands described in programs such as the printing APP 43. It is further noted that the processes performed by the CPU 11 include controlling of hardware with use of an interface (which is also referred to as an API) configured to perform data exchange with other modules of the OS 41 of the information processing device 1. In the following description, operations of respective programs will be described with omitting descriptions of the OS 41.

Figure 2:
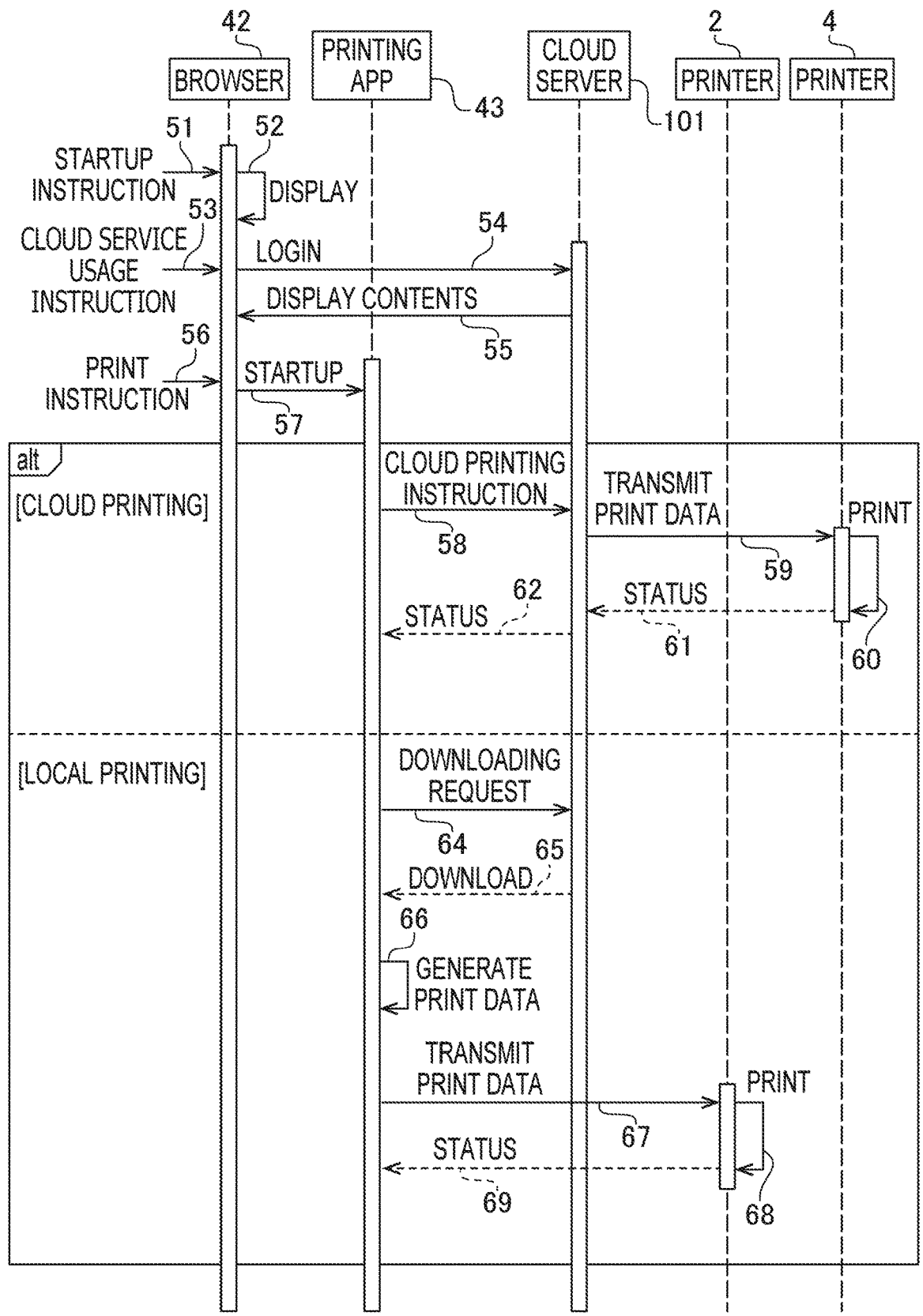
FIG. 2 is a sequential chart illustrating operations of the cloud printing system according to the illustrative embodiment.

Firstly, the printing operation will be schematically described, referring to a sequential chart shown in FIG. 2. The browser 42 is started by the CPU 11 in response to a user operation to instruct startup of the same (procedure 51), thereby the browser 42 causing the user I/F 15 to display a designated webpage (procedure 52). Further, the browser 42 receives an instruction, by the user operation, to use the cloud server 10 (procedure 53).

When allowing the browser 42 to use a stored content, the cloud server 101 request for login for authentication. The browser 42 obtains login information in accordance with a user operation, and transmits the obtained login information to the cloud server 101 (procedure 54). When the login is successful, the cloud server 101 makes the browser display the content (procedure 55).

When the content of the cloud server 101 is being displayed, the browser 42 receives the print instruction of the displayed content (procedure 56). In response to receipt of the print instruction of the content stored in the cloud server 101, the browser 42 starts the printing APP 43 which is a plugin APP (procedure 57).

When started up, the printing APP 43 display an inquiry questioning the user whether the cloud printing is performed or a local printing is performed in printing the designated content, and receives a user operation.

When the printing APP 43 receives an instruction to perform the cloud printing, the printing APP 43 receives a user selection of one of printers compliant with the cloud printing, and causes the selected cloud printer making user of the cloud printing service. According to the illustrative embodiment, the printer 4 has already been registered with the cloud printing service and is selectable as the cloud printer. Further, the printer 3 cannot perform the cloud printing when is has not been registered with the cloud printing service, but can be selected as the cloud printer since the printer 3 can perform the cloud printing once it is registered with the cloud printing service.

When, for example, an instruction to perform the cloud printing is received and the printer 4 is selected, the printing APP 43 outputs the execution instruction of the cloud printing to the cloud server 101 through the cloud printing service (procedure 58). The cloud server 101 generates the print data based on the instruction of the cloud printing, and transmits the print data to the printer 4 which is the designated cloud printer (procedure 59). Then, the printer 4 receives the print data and performs printing (procedure 60). As above, a printed matter based on the content stored in the cloud server 101 is output by the printer 4.

The printer 4 transmits status information (e.g., information indicating completion of printing) to the cloud server 101 (procedure 61). Then, the cloud server 101 transmits the received status information to the printing APP 43 (procedure 62). The printing APP 43 displays the received status information.

When an instruction to perform local printing is received, the printing APP 43 does not use the cloud printing service, but causes a local printer connected to the information processing device 1 perform printing. The printing APP 43 searches for printers capable of performing the local printing, receives a user's selection of one of the searched printers, and causes the selected printer to perform the local printing. According to the illustrative embodiment, the printers 2 and 3 are connected to the information processing device 1 and capable of performing the local printing. Therefore, the printers 2 and 3 are selectable as the local printer.

For example, when the instruction to perform the local printing is received and the printer 2 is selected as the local printer, the printing APP 43 requests the cloud server 101 for downloading of a content subject to be printed (hereinafter, referred to as an objective content) (procedure 64). Then, the printing APP 43 downloads the content from the cloud server 101 (procedure 65). That is, the printing APP 43 temporarily stores data of the contents in the RAM 13 of the information processing device 1. Further, the printing APP 43 generates print data having a format supported by the printer 2 based on the downloaded content (procedure 66).

Then, the printing APP 43 transmits the print data to the printer 2 (procedure 67). The printer 2 receives the print data and perform printing (procedure 68). Thus, a printed matter based on the content stored in the cloud server 101 is output by the printer 2. Then, the printer 2 transmits the status information (e.g., information indicating completion of printing) to the printing apparatus 43 (procedure 69). The printing APP 43 displays the received status information.

Next, the printing process performed by the browser 42 will be described, referring to a flowchart shown in FIG. 3. When the browser 42 is displaying a webpage of the cloud server 101, if a print instruction is input by the user operation, the printing process is started through the browser 42. The printing process is performed by the CPU 11. It is noted that the procedure numbers indicated in the following description correspond to the procedure numbers indicated in the sequential chart shown in FIG. 2.

In the printing process, the CPU 11 determines whether the user has logged in to the could server 101 handling the webpage displayed on the browser 42 (S101). Step S101 is an example of a log-in determining process. Determination whether the user has logged in or not is made, for example, by making an inquiry to the cloud server 101. When it is determined that the user has not logged in to the cloud server 101 (S101: NO), the CPU 11 executes a login process (S102, procedure 54).

Figure 4:
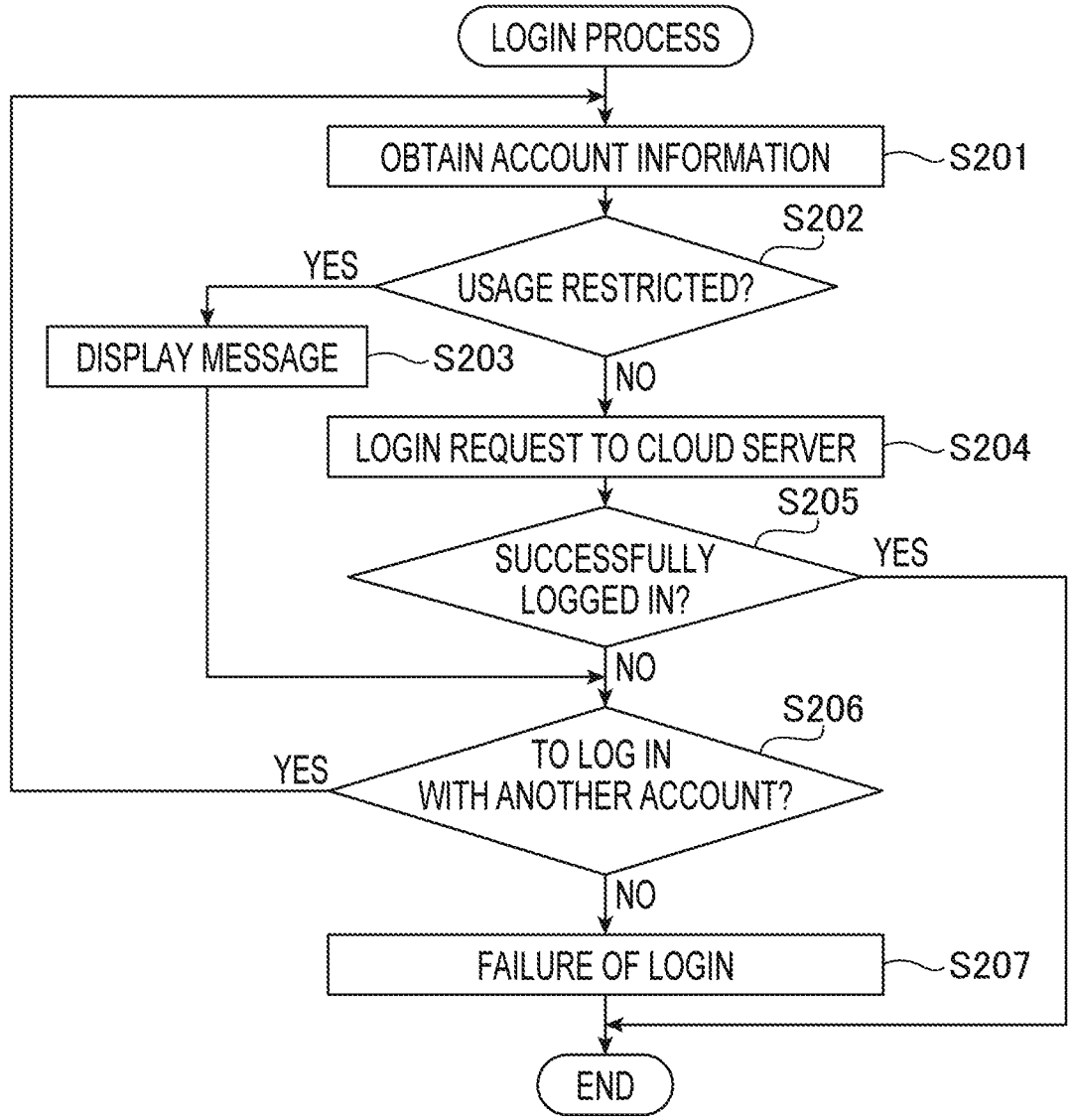
FIG. 4 is a flowchart illustrating a login process according to the illustrative embodiment.

Next, the login process will be described, referring to a flowchart shown in FIG. 4. In the login process, the CPU 11 firstly obtains account information which is input by the user (S201). Step S201 is an example of an account obtaining process. The account information is, for example, associated with ID or a combination of an email address and a password, and the account information has been stored in advance, by the user, in the cloud server 101. It is noted that the user who has not yet registered an account executes the login procedure after, for example, creating an account through an account creating page of the cloud server 101.

The account information may be information input through the browser 42, or information added as parameters when the printing APP 43 is started up. It is noted that the browser 42 has a cache function and my store ID and/or password information which were stored in the past. When the browser 42 has cache information, the login may be automatically done with omitting the account information inputting operation. Alternatively, the browser 42 may refer to the cache information and displays the account information on the login page.

The CPU 11 determines whether the obtained account information is subject to usage restriction of the cloud server 101 (S202). Step S202 is an example of a restriction determining process. When it is determined that the usage is restricted (S202: YES), the CPU 11 controls the user I/F 15 to display a message indicating that usage of the cloud server 101 is restricted (S203) and does not proceed to the login procedure. That is, even if the input account information is usable to log in to the cloud server 101, login to the cloud server 101 with the account subject to usage restriction of the cloud server 101 is restricted.

There could be a case where, for a certain account, browsing of contents stored in the cloud server 101 is allowed, while printing thereof is not allowed. There could also be a case where, when the information processing device 1 is shared among a plurality of users, usage of the cloud printers set to the information processing device 1 is restricted for certain accounts. Therefore, the printing APP 43 may be configured, for example, to obtain a list of accounts subject to usage restriction, and execute the determination in S202 based on whether the account information obtained in S201 is included in the obtained list. It is noted that the usage restriction list may be managed with use of a database used in the information processing device 1 itself, or may be obtained from an external server when necessary.

When it is determined that usage of the obtained account information is not restricted (S202: NO), the CPU 1 transmits a login request using the obtained account information to the cloud server 101 (S204). Step S204 is an example of a login requesting process. Then, the CPU 11 determines where login is successfully done (S205). When it is determined that login is successful (S205: YES), the CPU 11 terminates the login process and returns to the printing process.

When it is determined that login was failed (S205: NO) or after execution of S203, the CPU 11 determines whether login using another account information is to be performed (S206). When, for example, it is determined that another login is to be performed based on a user instruction (S206: YES), the CPU 11 returns to S201 and obtains a new piece of the account information.

When it is determined that login using another account information is not performed (S206: NO), the CPU 11 determines that login was failed (S207) and terminates the login process. It is noted that the CPU 11 determines that login with another account is not performed when, for example, a user instruction to stop the login process is received, or a particular period of time has elapsed without obtaining new account information. it is noted that, when S203 is executed due to usage restriction of the obtained account, the CPU 11 may proceed to S207 to terminated the login process without receiving login with another account (i.e., with skipping S206).

By executing the login process, the CPU 11 transmits the login request to the cloud server 101 when usage of the cloud server 101 with the account is not restricted, while the CPU 11 does not transmit the login request to the cloud server 101 when usage of the cloud server 101 with the account is restricted. According to such a configuration, occurrence of an unexpected cloud printing can be suppressed.

Figure 3:
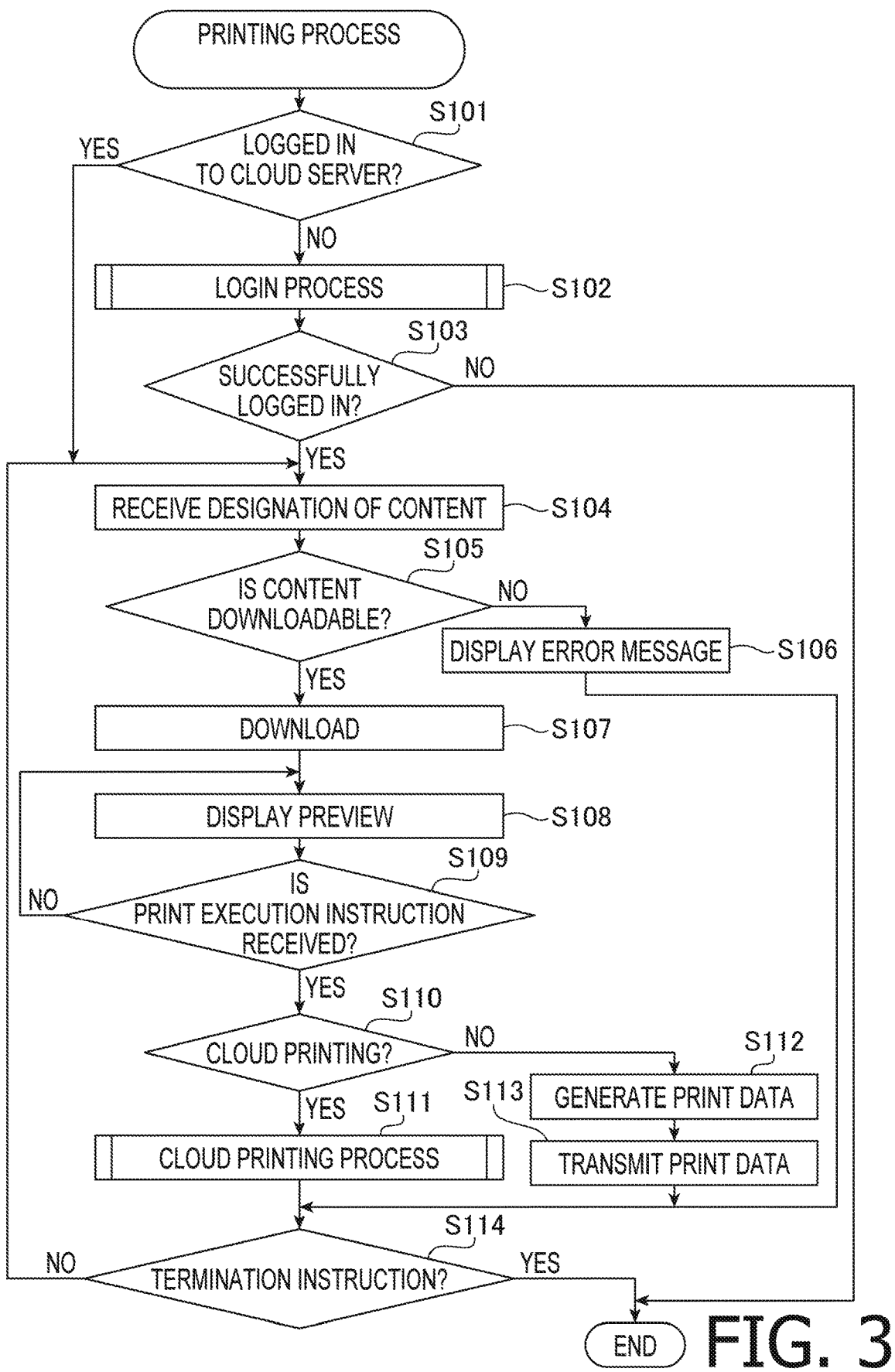
FIG. 3 is a flowchart illustrating a printing process according to the illustrative embodiment.

Returning to description on the printing process shown in FIG. 3, the CPU 11 determines whether login with the login process in S102 was successful (S103). When it is determined that login was failed (S103: NO), the CPU 11 terminates the printing process since printing of the contents of the cloud server cannot be performed.

When it is determined that login with the account has already been done (S101: YES) or it is determined that the login was successful (S103: YES), the CPU 11 receives designation of a content subject to be printed (S104). In this case, the CPU 11, for example, controls the user I/F 15 to display a list of contents and receives a user's designation of one of the contents. Thereafter, the CPU 11 determines whether the designated content is downloadable (S105).

When it is determined that the designated content cannot be downloaded (S105: NO), the CPU 11 controls the user I/F 15 to display a message indicating that printing cannot be performed (S106). It is note that there are contents to which information prohibiting downloading thereof is added. When a content, which is allowed to be browsed on a webpage but is not allowed to be downloaded or printed, is designated, the CPU 11 determines that the content cannot be downloaded (S105: NO).

When it is determined that the designated content is downloadable (S105: YES), the CPU 11 downloads the designated content (S107, procedures 64 and 65). Step S107 is an example of a downloading process. Then, the CPU 11 controls the user I/F 15 to display a print preview indicating an image when the downloaded content is printed (S108). Thereafter, the CPU 11 determines whether an instruction to execute printing is received (S109).

When the print preview is being displayed, the CPU 11 determines whether, for example, instructions to select the cloud printing or the local printing, to designate a printer to be used for printing, to change printing conditions and to execute printing. When it is determined that the print execution instruction has not been received (S109: NO), the CPU 11 keeps displaying the print preview. It is noted that the CPU 11 modifies the image of the print preview in accordance with the received print settings.

When it is determined that the print execution instruction is received (S109: YES), the CPU 11 further determines whether the print settings of the received print execution instruction indicate the cloud printing or the local printing (S110). Step S110 is an example of a selection process.

Figure 5:
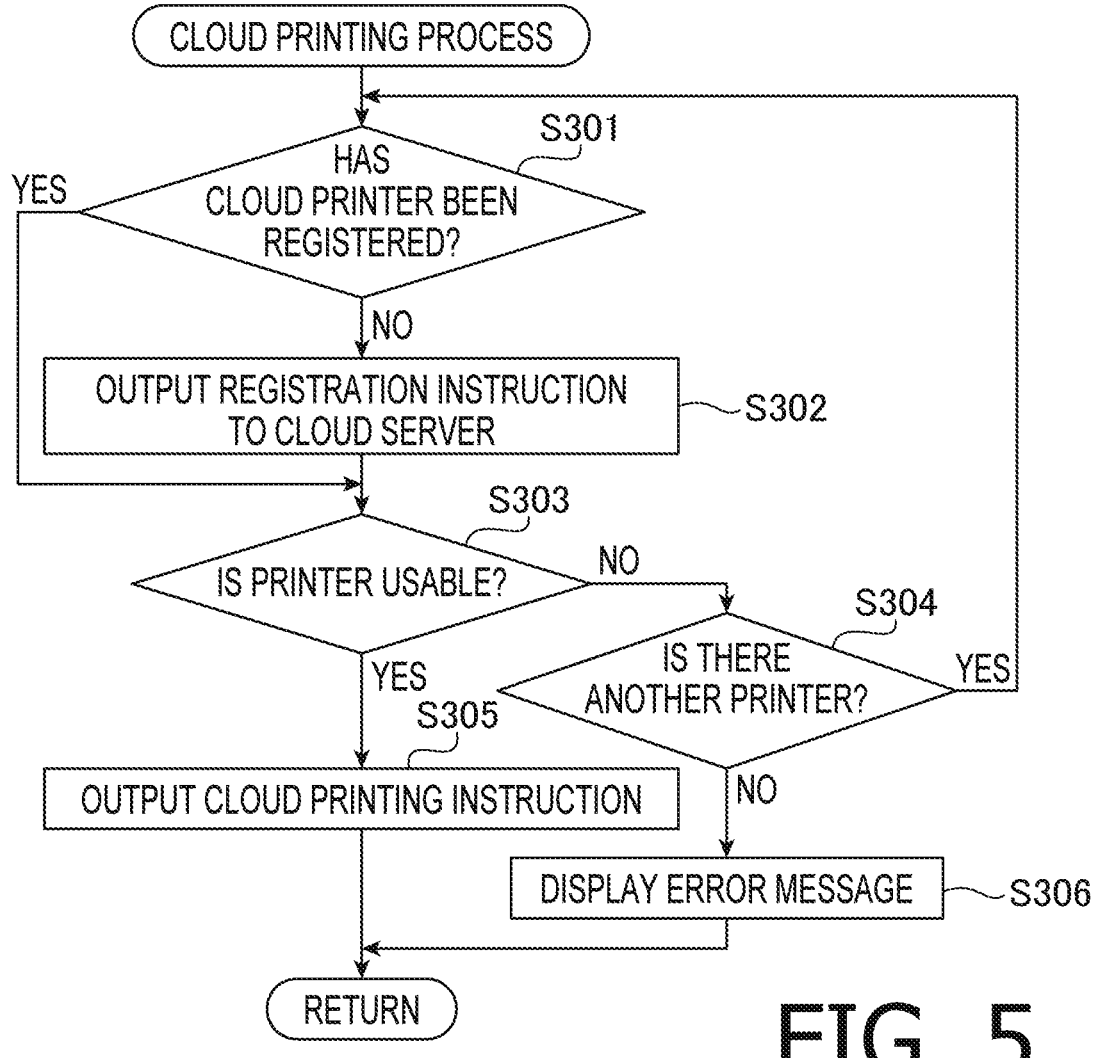
FIG. 5 is a flowchart illustrating a cloud printing process according to the illustrative embodiment.

When it is determined that the print execution instruction indicates execution of the cloud printing (S110: YES), the CPU 11 executes the cloud printing process (S111). The cloud printing process will be described in detail with reference to a flowchart shown in FIG. 5.

In the cloud printing process, the CPU 11 firstly determines whether the designated printer has been registered as the cloud printer (S301). Step S301 is an example of a cloud printer determining process. According to the illustrative embodiment, when the designated printer is the printer 4, the CPU 11 determines that the designated printer has been registered as the cloud printer, while when the designated printer is the printer 3, the CPU 11 determines that the designated printer has not been registered as the cloud printer.

When it is determined that the designated printer has not been registered as the cloud printer (S301: NO), the CPU 11 transmits information regarding the printer 3 to the cloud printing service, and further outputs information instructing to register the printer 3 as the cloud printer to the cloud print service (S302). Step S302 is an example of a printer registration instruction outputting process.

For example, when the print execution instruction to make the printer 3 perform the cloud printing is received, it is necessary to register the printer 3 as the cloud printer. When the cloud printing is selected but the designated printer has not been registered with the cloud service as the cloud printer, the printing APP 43 registers the information on the printer designated by the information processing device 1 with the cloud printing service. Therefore, a user's troublesome operation to register the printer with the cloud printing service can be suppressed. It is noted that, to the registration instruction, the identification information on the designated printer, that is information used by the cloud server 101 to access the printer is added.

When it is determined that the designated printer has been registered with the cloud printing service (S301: YES), or after execution of S302, the CPU 11 determines whether the designated printer is in a usable state (S303). When the printer 3 or printer 4 is in an offline state or an error and stopped state, the printer 3 or 4 is not in the usable state. The CPU 11 transmits, for example, a status inquiry to the printer 3 or 4 (i.e., the designated printer) and makes the decision in S303 based on whether a response indicating a usable state is received or not. Alternatively, the CPU 11 may transmit the inquiry regarding S303 through the cloud server 101.

When it is determined that the designated printer is not in the usable state (S303: NO), the CPU 11 determines whether there exists another printer (S304). The CPU 11, for example, controls the user I/F 15 to display that the designated printer is not usable, and encourages the user to select another printer. At this stage, the CPU 11 may control, for example, the network I/F 16 or the USB I/F 17 to determine whether there exists a printer in the usable state, and display other printers (i.e., usable printers) as selectable printers. When it is determined that there are other printers (S305: YES), the CPU 11 returns to S301 and determines whether the newly designated printer has been registered as the cloud printer.

When it is determined that the designated printer is in the usable state (S303: YES), the CPU 11 outputs an instruction to perform the clout printing to the cloud server 101 (S305, procedure 58), and terminates the cloud printing process. Step S305 is an example of a cloud printing instruction outputting process. The CPU 11 causes the cloud server 101 to output an instruction to transmit print data to the designated printer. Then, the could server 101 transmits the print data to the printer, and the printer performs printing based on the print data transmitted from the cloud server 101.

When it is determined that there is no usable printer (S305: NO), the CPU 11 controls the user I/F 15 to display an error message (S306) and terminates the cloud printing process.

Returning to description on the printing process shown in FIG. 3, when it is determined that the received print instruction is not an instruction to perform the cloud printing (S110: NO), the CPU 11 generates print data based on the downloaded content which is downloaded in S107 (S112). Then, the CPU 11 transmits the generated print data to the designated printer and causes the designated printer to perform printing (S113). Step S113 is an example of a print data transmitting process. When the printer 2 is selected or when causing the printer 3 to perform printing without registering the same with the cloud print server, the CPU 11 does not perform the cloud printing. It is possible to make a printer, which is not compliant with the cloud printing, perform printing of the content by transmitting the generated print data.

After execution of S107, S11 or S113, the CPU 11 determines whether a terminating instruction to terminate printing is received (S114). When it is determined that the terminating instruction is not received (S114: NO), the CPU 11 returns to S104 and receives designation of a content subject to be printed. On the other hand, when it is determined that the terminating instruction is received (S114: YES), the CPU 11 terminates the printing process. Optionally, the CPU 11 may delete the downloaded content before terminating the printing process.

As described above in detail, the printing APP 43 according to the illustrative embodiment is started by the plugin function of the browser 42, when the instruction to print a content stored in the cloud server 101 is received through the browser 42. The printing APP 43 is capable of receiving selection of the local printing so that the content stored in the cloud server 101 can be printed by the printer which is not registered with the cloud server (e.g., a printer which is not compliant with the cloud printing). When the cloud printing is selected, the printing APP 43 executes the cloud printing. That is, with the printing APP 43, printing with the cloud printer and printing with the local printer can be selected, thereby improvement of usability for the user being expected.

Besides the cloud printing, there is known a driverless printing technique in which general purpose print data which is not restricted by the model of the printer is generated and transmitted to a printer. In order to perform printing according to the driverless printing, the printer is required to have function to generate print data based on the general purpose print data. In other words, if a printer which does not have such a generating function cannot perform the driverless printing. For example, when the print data transmitted by the cloud printing service is the general purpose print data compliant with the driverless printing technique, printers which do not have the above-described generating function cannot perform printing. In contrast, according to the printing APP 43, it is possible to make printers which are not compliant with the cloud printing service print the content of the cloud server 101, improvement of usability for the user can be expected.

It is noted that configurations described above according to the illustrative embodiment are only illustrative ones and are not intended to limit aspects of the present disclosures. Accordingly, the technique according to the present disclosures can be improved, modified or enhanced without departing from aspects of the preset disclosures. for example, the above-described configuration may be applied to a system which employs only one of the local printer to perform the local printing and the cloud printer to perform the cloud printing.

Optionally, the usage restriction may be released. For example, if a user with a certain account is allowed to log in to the cloud server 101, the user with the certain account may be allowed to perform printing.

According to the illustrative embodiment, when a user has been logged in to the cloud server 101 when the printing APP 43 is started, the login process is not performed. This configuration may be modified such that, even if the user has been logged in, the restriction information may be checked based on the account information. For example, when the account information after the user has logged in is same as the account information with which execution of printing in the information processing device 1, the used may be forcibly logged out with displaying a message.

For example, if a print preview is not displayed, downloading of a content may not be performed when the cloud printing is selected. For example, after execution of S104 of the printing process, S110 is executed. Then, only when the decision in S110 is "NO", S105 may be executed. That is, only when the local printing is selected, downloading is performed. Alternatively, even the cloud printing is to be performed, downloading is performed if an instruction to display a print preview is received.

It is noted that the processes described in the embodiments may be performed by a single CPU, a plurality of CPU's, hardware such as an ASIC and/or any combination of the same. Further, the processes described above may be realized by various modes including computer-executable instructions stored in a non-transitory computer-readable recording medium, or a method of controlling the information processing device.

What is claimed is:

1. A non-transitory computer-readable recording medium for an information processing device having a communication interface and a controller, the information processing device being connected to a cloud server through the communication interface,
   a particular program being installed in the information processing device,
   the recording medium storing computer-executable instructions realizing an application program,
   the application program being added to the particular program by a plugin function implemented in the particular program,
   the information processing device being configured to receive, through the particular program, a print instruction to print a content stored in the cloud server,
   the application program causing, when executed by the controller, the information processing device to perform:
      a downloading process of downloading the content from the cloud server;
      a selection process of receiving a selection between a cloud printing and a local printing, the cloud printing being a printing process performed by causing the cloud server to transmit print data to a cloud printer which is a printer registered with the cloud server, the local printing being a printing process performed by transmitting print data to a local printer which is a printer connected to the information processing device through the communication interface;
      when the cloud printing is selected in the selection process, a cloud printing instruction outputting process of outputting an instruction to perform the cloud printing to the cloud server; and
      when the local printing is selected in the selection process, a print data transmitting process of generating print data based on the content downloaded in the downloading process and transmitting the print data as generated to the local printer.

2. The non-transitory computer-readable recording medium according to claim 1,
   wherein the application program further causes, when executed by the controller, the information processing device to perform:
   when the cloud printing is selected in the selection process, a cloud printer determining process of determining whether a printer is registered with the cloud server; and
   when it is determined that the printer is not registered in the cloud printer determining process, a printer registration instruction outputting process of outputting an instruction to register a local printer with the cloud server.

3. The non-transitory computer-readable recording medium according to claim 1,
   wherein the application program further causes, when executed by the controller, the information processing device to:
   perform the downloading process before the selection process, and
   display, in the selection process, a print preview corresponding a selected printer with a user interface of the information processing device with use of the content downloaded in the downloading process.

4. The non-transitory computer-readable recording medium according to claim 1,
   wherein the application program further causes, when executed by the controller, the information processing device to perform:
   an account obtaining process of obtaining account information used to log in to the cloud server;
   when the account information is obtained in the account obtaining process, a restriction determining process of determining whether usage of the cloud server with use of the account information as obtained is restricted; and
   a login requesting process in which:
      when it is determined, in the restriction determining process, that usage of the cloud server is not restricted, requesting the cloud server to accept login with the account information obtained in the account obtaining process; and
      when it is determine, in the restriction determining process, that usage of the cloud server is restricted, not requesting the cloud server to accept login with the account information obtained in the account obtaining process.

5. The non-transitory computer-readable recording medium according to claim 4, wherein the application program further causes, when executed by the controller, the information processing device to:
perform a login determining process of determining whether a user is being logged in to the cloud server with the account information obtained in the account obtaining process;
when it is determined, in the login determining process, that the user is not being logged in to the cloud server, perform the restriction determining process and the login requesting process; and
when it is determined, in the login determining process, that the user is being logged in to the cloud server, perform neither the restriction determining process nor the login requesting process.

6. A non-transitory computer-readable recording medium for an information processing device having a communication interface and a controller, the information processing device being connected to a cloud server through the communication interface,
a particular program being installed in the information processing device,
the recording medium storing computer-executable instructions realizing an application program,
the application program being added to the particular program by a plugin function implemented in the particular program,
the information processing device being configured to receive, through the particular program, a print instruction to print a content stored in the cloud server,
the application program causing, when executed by the controller, the information processing device to perform:
a downloading process of downloading the content from the cloud server;
a selection process of receiving a selection between a cloud printing and a local printing, the cloud printing being a printing process in which print data is transmitted to a printer from the cloud server not through the information processing device, the local printing being a printing process in which print data is transmitted to a printer from the information processing device;
when the cloud printing is selected in the selection process, a cloud printing instruction outputting process of outputting an instruction to perform the cloud printing to the cloud server; and
when the local printing is selected in the selection process, a downloading process of downloading the content from the cloud server and a print data transmitting process of generating print data based on the content downloaded in the downloading process and transmitting the print data as generated to the printer configured to perform the local printing.

7. The non-transitory computer-readable recording medium according to claim 6,
wherein the application program further causes, when executed by the controller, the information processing device to:
perform the downloading process before the selection process, and
display, in the selection process, a print preview corresponding a selected printer with a user interface of the information processing device with use of the content downloaded in the downloading process.

8. The non-transitory computer-readable recording medium according to claim 6,
wherein the application program further causes, when executed by the controller, the information processing device to perform:
an account obtaining process of obtaining account information used to log in to the cloud server;
when the account information is obtained in the account obtaining process, a restriction determining process of determining whether usage of the cloud server with use of the account information as obtained is restricted; and
a login requesting process in which:
when it is determined, in the restriction determining process, that usage of the cloud server is not restricted, requesting the cloud server to accept login with the account information obtained in the account obtaining process; and
when it is determine, in the restriction determining process, that usage of the cloud server is restricted, not requesting the cloud server to accept login with the account information obtained in the account obtaining process.

9. The non-transitory computer-readable recording medium according to claim 8,
wherein the application program further causes, when executed by the controller, the information processing device to:
perform a login determining process of determining whether a user is being logged in to the cloud server with the account information obtained in the account obtaining process;
when it is determined, in the login determining process, that the user is not being logged in to the cloud server, perform the restriction determining process and the login requesting process; and
when it is determined, in the login determining process, that the user is being logged in to the cloud server, perform neither the restriction determining process nor the login requesting process.

10. A method, for an information processing device, of printing a content stored in a cloud server, comprising:
starting a browser;
receiving login information to be used to log in to the cloud server;
logging in to the cloud server by transmitting the login information to the cloud server;
receiving a content from the cloud server and displaying the received content on the browser;
receiving a print instruction to print the content displayed on the browser;
starting a printing application in which the information processing device performs:
downloading the content from the cloud server;
receiving an instruction to perform one of a cloud printing and a local printing, the cloud printing being a printing process performed by causing the cloud server to transmit print data to a cloud printer which is a printer registered with the cloud server, the local printing being a printing process performed by transmitting print data to a local printer which is a printer connected to the information processing device through the communication interface;
when the received print instruction indicates to perform the cloud printing, transmit cloud printing instruction to a cloud server, the cloud server transmitting print data to a printer configured to perform the cloud printing; and
when the received print instruction indicates to perform the local printing, downloading the content from the cloud server, generating print data based on the downloaded content, transmitting generated print data to a printer configured to perform the local printing.

* * * * *